(12) United States Patent
Mellin (10) Patent No.: US 10,420,333 B2
(45) Date of Patent: Sep. 24, 2019

(54) SPRAY ASSEMBLY FOR BOOM SPRAYER

(71) Applicant: DEERE & COMPANY, Moline, IL (US)

(72) Inventor: Michael J. Mellin, Ankeny, IA (US)

(73) Assignee: DEERE & COMPANY, Moline, IL (US)

( * ) Notice: Subject to any disclaimer, the term of this patent is extended or adjusted under 35 U.S.C. 154(b) by 280 days.

(21) Appl. No.: 14/703,578

(22) Filed: May 4, 2015

(65) Prior Publication Data

US 2016/0324137 A1 Nov. 10, 2016

(51) Int. Cl.
| | | |
|---|---|---|
| *A01M 7/00* | (2006.01) | |
| *B05B 1/16* | (2006.01) | |
| *F16L 41/12* | (2006.01) | |
| *B05B 15/658* | (2018.01) | |
| *A01C 23/04* | (2006.01) | |

(52) U.S. Cl.
CPC ......... *A01M 7/0071* (2013.01); *A01C 23/047* (2013.01); *A01M 7/006* (2013.01); *A01M 7/0042* (2013.01); *B05B 15/658* (2018.02); *F16L 41/12* (2013.01); *B05B 1/1645* (2013.01)

(58) Field of Classification Search
CPC .. A01M 7/0071; A01M 7/0042; A01M 7/006; A01C 23/047; B05B 1/1645; B05B 15/658; F16L 41/12
USPC ........................................................ 239/159
See application file for complete search history.

(56) References Cited

U.S. PATENT DOCUMENTS

| | | | |
|---|---|---|---|
| 3,009,655 A | 11/1961 | Palmer | |
| 3,863,841 A | 2/1975 | Berthoud | |
| 4,345,785 A | 8/1982 | Bradford | |
| 6,036,103 A * | 3/2000 | Benest | B05B 7/0416 239/159 |
| 6,152,388 A | 11/2000 | Rohloff | |
| 6,193,166 B1 * | 2/2001 | Miller | A01M 7/006 239/163 |

(Continued)

FOREIGN PATENT DOCUMENTS

DE 19507741 A1 9/1997

OTHER PUBLICATIONS

Prairie Farmer, Hypro Express Nozzle Body End Caps Boost Water Efficiency, http://farmprogress.com/story-hypro-express-nozzle-body-end-caps-boost-water-efficiency-13-59884, May 17, 2012.

(Continued)

*Primary Examiner* — Darren W Gorman
(74) *Attorney, Agent, or Firm* — Taft Stettinius & Hollister LLP; Stephen F. Rost (57) ABSTRACT

A boom spray assembly, such as for an agricultural sprayer, has a feed pipe and a spray pipe with a continuous tubular body. The tubular body has at least one facial feed opening therein between the ends opening along a second axis at an angle to a first axis of the tubular body. A saddle fitting is coupled to the spray pipe that defines a first passageway extending along the first axis to receive the tubular body and defines a second passageway extending along the second axis in registration with the at least one facial feed opening and receiving spray material from the at least one feed pipe. At least one spray nozzle is coupled to the tubular body of the at least one pipe in communication with the first and second passageways.

18 Claims, 7 Drawing Sheets

(56) References Cited

U.S. PATENT DOCUMENTS

| | | | |
|---|---|---|---|
| 6,375,089 B1 * | 4/2002 | Taylor | A01M 7/0042 239/1 |
| 6,557,787 B2 | 5/2003 | Swan | |
| 6,712,293 B2 | 3/2004 | Swan | |
| 7,613,163 B2 | 11/2009 | Pandel et al. | |
| 7,861,946 B2 * | 1/2011 | Beeren | B05B 1/1645 137/625.11 |
| 7,980,490 B2 * | 7/2011 | Waddelow | B05B 15/065 239/159 |
| 2003/0235509 A1 | 12/2003 | Maki | |
| 2005/0017103 A1 | 1/2005 | Goebel | |
| 2006/0076776 A1 | 4/2006 | Beeren et al. | |
| 2008/0179429 A1 | 7/2008 | Beilke et al. | |
| 2010/0200668 A1 | 8/2010 | Kahn et al. | |
| 2011/0240143 A1 * | 10/2011 | Lang | F16L 55/1108 137/343 |
| 2015/0367358 A1 * | 12/2015 | Funseth | A01G 25/16 239/159 |
| 2015/0369407 A1 * | 12/2015 | Lang | F16L 55/1108 239/159 |

OTHER PUBLICATIONS

John Deere, Self-Propelled Sprayers Brochure, Jun. 2014.
Extended European Search Report, European Paten Office, dated Sep. 30, 2016, pp. 1-7.

\* cited by examiner

FIG. 5

SPRAY ASSEMBLY FOR BOOM SPRAYER

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

The present disclosure relates to agricultural sprayers for the application of liquid or solid materials, including the agricultural sprayers having one or more booms for extending spray assemblies across a field.

BACKGROUND OF THE DISCLOSURE

In various settings, it may be useful to apply (e.g., distribute or disperse) various materials in a relatively controlled manner. For example, in agricultural settings, it may be useful to apply pesticide, herbicide, or fertilizer to select locations in a field, in order to control pest activity, kill weed, and encourage crop growth, respectively. Material for application may take a variety of forms, including liquid form or solid form. Liquid for application may be provided in various containers, such as liquid tanks, which may or may not be refillable by users. Various sprayer systems (e.g., a nozzle attached to the end of a telescoping or foldable boom) may be utilized.

Modern agricultural sprayers are typically self-propelled vehicles or towed implements. To extend the spray swathe achieved as the sprayer traverses a field, the sprayer may be outfitted with large fixed or retractable booms supporting the material transport and delivery components. For example, pipe or other conduit may run from a centrally arranged supply tank or trailer outward along the boom. Solution is then pumped from the supply tank under pressure toward the outer end(s) of the boom(s). When the boom(s) span long distances, sections of pipe or other conduit may be coupled together in series. This may be accomplished by the use of unions or other couplers attached to the ends of pipe sections by various means (e.g., threads, welding, etc.)

It may also be useful to distribute the material along the length of the boom in evenly spaced (or other) locations, for example, to conform to row spacing of the crop. As such, it is often desired to provide spray nozzles or other outlets in addition to or instead of at the unions between mating spray pipe sections in order to keep from the pipe sections from being excessively numerous or short in length. Consequently, the sections of the spray pipe may have spaced apart openings where nozzle assemblies are coupled to the pipe. Since the spacing and rotational orientation of the openings may be set according to the row spacing of the crop or other pre-determined spacing and positioning, the openings of one pipe section may need to be properly aligned with the openings of the mating pipe or pipes. Assembling the mating parts by threaded connections or welding and the like complicates the alignment of this spacing and orientation.

Further, it may also be useful to provide various flow control components to aid in proper flow through the spray pipes. For example, it is known to couple flow valves and aspirators to the spray pipes. Aspirators, for instance, may be mounted, by threaded or welded connection, at one or both ends of a spray pipe to improve inlet air flow to the spray pipe. Unfortunately these flow components may increase the number of joints in the assembly, and thereby further complicate properly locating the various spray outlets or nozzles across mating spray pipes of the boom.

Additionally, when manufacturing sprayers of various configurations (e.g., boom length, flow capacity, etc.), factors such as those noted above may significantly increase the complexity of manufacturing and may require inventorying numerous spray pipe assemblies (e.g., one or more for each model sprayer) or require each sprayer to be effectively custom built.

SUMMARY OF THE DISCLOSURE

A boom sprayer is disclosed for application of various wet or dry materials, including for application of pesticides, herbicides and fertilizers in agricultural settings.

According to one aspect of the disclosure, in a sprayer having a boom frame, a spray assembly is mounted to the boom frame. The spray assembly may include at least one feed pipe operationally coupled to a spray material supply and may also include at least one spray pipe. Each spray pipe may have a unitary tubular body extending along a first axis between opposite ends. The tubular body may have at least one facial feed opening therein between the ends opening about a second axis at an angle to the first axis. At least one saddle fitting may be mounted to the tubular body of the at least one spray pipe. The at least one saddle fitting may define a first passageway extending along the first axis and receiving the tubular body. The tubular body may also define a second passageway extending along the second axis in registration with the at least one facial feed opening and receiving spray material from the at least one feed pipe. At least one nozzle may be coupled to the tubular body of the at least one pipe in communication with the first and second passageways.

According to another aspect the disclosure provides a sprayer with a boom frame and at least one spray assembly mounted to the boom frame. Each spray assembly may include at least one feed pipe operationally coupled to a spray material supply and may also include at least one spray pipe. Each spray pipe may have a unitary tubular body extending along a first axis between opposite ends. The tubular body may have at least one facial feed opening therein between the ends opening about a second axis at an angle to the first axis. At least one saddle fitting may be mounted to the tubular body of the at least one spray pipe. The at least one saddle fitting may define a first passageway extending along the first axis and receiving the tubular body. The tubular body may also define a second passageway extending along the second axis in registration with the at least one facial feed opening and receiving spray material from the at least one feed pipe. At least one nozzle may be coupled to the tubular body of the at least one pipe in communication with the first and second passageways.

The details of one or more implementations of the disclosure are set forth in the accompanying drawings and the description below. Other features and advantages will become apparent from the description, the drawings, and the claims.

BRIEF DESCRIPTION OF THE DRAWINGS

Like reference numerals in the drawings indicate like components, parts, or operations.

DETAILED DESCRIPTION

The following describes one or more example implementations of the disclosed sprayer, as shown in the accompanying figures of the drawings described briefly above.

As noted above, in various settings, it may be useful to apply (e.g., distribute or disperse) various materials in a relatively controlled manner. For example, in agricultural settings, it may be useful to apply material (e.g., liquid or solid herbicide, fertilizer, pesticide, and so on) to an agricultural field. Self-propelled or towed agricultural sprayers may use long booms to support lengths of spray pipe that deliver the material to spray nozzles spaced along the spray pipe(s). The boom supported spray pipes allow the material to be applied in wide swathes traverse to the sprayer direction of travel. While an agricultural boom spray is shown and described herein, the disclosure may also apply to certain non-agricultural applications, such as various irrigation systems as well as in certain applications used in the petroleum (oil and gas) industry.

In certain embodiments it may be useful to reduce the number of, or eliminate, joints in, or between, the spray pipes. Apart from a simple part-count reduction, as well as reducing or avoiding leakage points, using long, uncut lengths of pipe may better facilitate the manufacture and assembly of the spray pipe assemblies. Reducing or eliminating the union of mating spray pipes reduces or eliminates the need to align features of each mating spray pipe during the joining process, which can be time-consuming and cumbersome. Alignment of two sections of pipe connected in the middle with a T-fitting, which in some cases may be threaded, increases manufacturing difficulty. This alignment is critical for aligning the nozzles on ether side of the T-fitting and creating a uniform spray pattern. With a continuous pipe problem is alleviated or eliminated.

For example, a boom section may have a spray pipe assembly in which a single, continuous length of pipe is used to carry the material to the nozzles. In this case, multiple nozzles may be attached to the spray pipe at a plurality of spaced openings formed in alignment along the length of the spray pipe. No secondary alignment procedure is necessary, as would be necessary, for example, if two spray pipes were mated in the middle, such that the length of pipe to the left of the union would need to be rotationally oriented to match the length of pipe to the right of the union. This would bring the apparent complications to any threading or welding connection at the union of the mating pipes.

Along these lines it may also be useful to improve the connection of the spray pipe to the supply feed pipe. For example, a spray pipe assembly may have a saddle fitting coupling. The saddle fitting may have a split saddle configuration that fits over a continuous length of pipe, rather than being inserted between mating pipe sections. Each saddle fitting may define a first passageway extending along the axis of the spray pipe and a second passageway extending along a second axis in registration with a corresponding opening in the spray pipe. A feed pipe, or connector for a feed pipe, may then be coupled to the saddle fitting and communicate with the opening through the second passageway.

Still further it may be useful to reduce or eliminate complications with the alignment of other components of the spray pipe assembly. For example, aspirators may need to be aligned with the nozzles or other features of the assembly. Use of a single spray pipe helps, but the aspirator may still need to be aligned with the nozzles of the spray pipe, which may be time-consuming and cumbersome in a manner similar to mating spray pipe sections to center T-fittings. Thus, a spray pipe assembly may include an inset aspirator. For example, the aspirator may have an elongated body configured to fit inside the spray pipe. A head may extend outside of the spray pipe, for example, through an open end thereof. The head may have an opening in communication with an internal passageway extending from the head to the body for an air inlet component as well as possibly for another spray nozzle. A simple set screw, detent or other connection may be used to fix the rotational orientation of the aspirator.

Figures 1, 2:
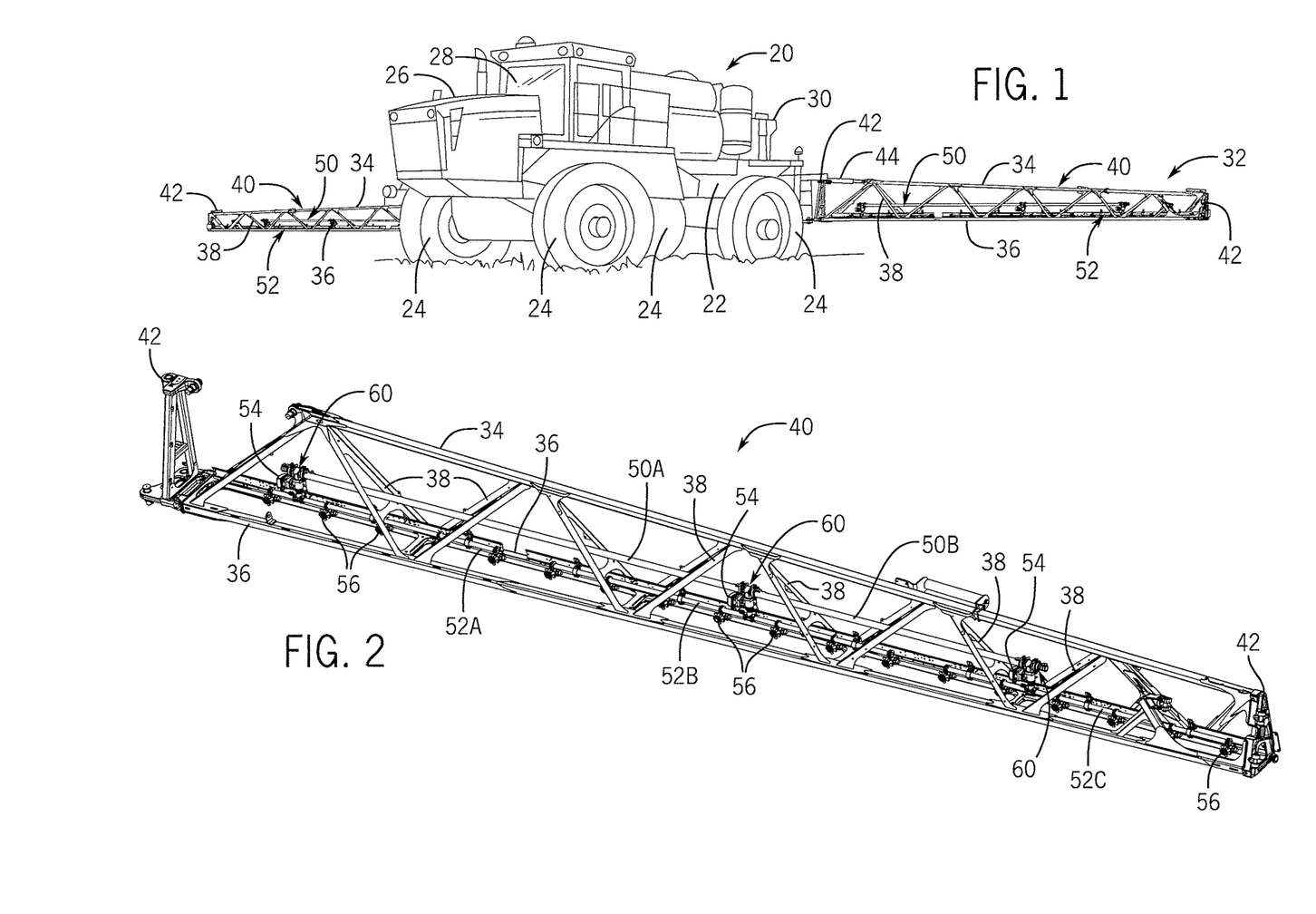
FIG. 1 is a perspective view of example agricultural sprayer having retractable spray booms for application of material during a spray operation.
FIG. 2 is a perspective view of a section of a boom assembly thereof.

Referring now to FIG. 1, the disclosed spray pipe assembly system may be implemented with respect to an agricultural sprayer 20, which may be self-propelled or in the form of a trailed or towed implement pulled by a tractor. The sprayer 20 features a chassis frame 22 supported off the ground by large-diameter, ground-engaging wheels 24. The frame 22 supports an engine compartment 26, an operator cabin 28, a supply tank 30 and a boom assembly 32. Various hydraulics components as well as solution mixing and spray pump and control hardware may be carried onboard the chassis frame 22 as well.

Referring also to FIG. 2, generally, as is understood in the art, the boom assembly 32 may be a generally rigid framework of tubular or solid frame structures. For example, the boom assembly may have upper and lower carriers 34, 36 interconnected with numerous struts 38 forming a trussed arrangement. The boom assembly 32 may include several sections, such as of decreasing size moving outward, that are coupled together to extend in total to lengths of near or over 100 feet. For clarity, FIG. 1 shows the sprayer 20 with only the innermost boom section 40 extending out on each side of the sprayer 20. The boom sections may be interconnected, and the innermost boom sections 40 may be connected to the chassis frame 22, via hinges 42 that facilitate folding of the boom assembly 32 into a position suitable for transportation and unfolding of the boom assembly 32 into an operating position, as shown in FIG. 1. Hydraulic cylinders or other actuators may provide the motive force for hinging the boom sections between operating and transport positions. The boom assembly 32 may support conduits on both sides of the sprayer 20 that are in communication with the supply tank 30 via various supply and return hoses (not shown), which, in the case of liquid material, supply and return liquid from and to the supply tank 30, as needed. As will be described in detail, the conduits may carry the liquid to spray nozzles spaced apart along the length of the boom assembly 32.

Figures 3, 4:
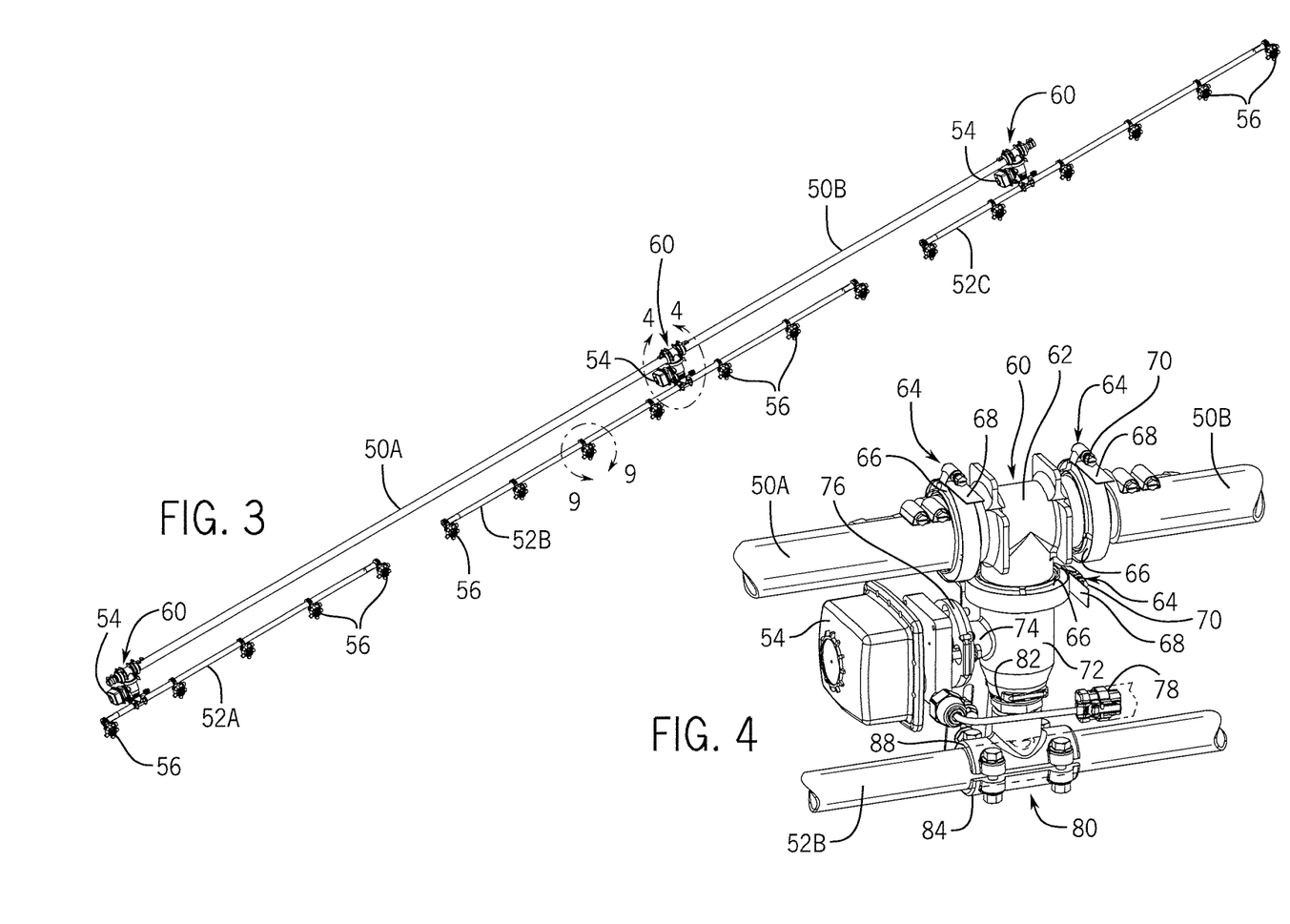
FIG. 3 is a perspective view of spray assembly thereof.
FIG. 4 is a partial perspective view of a union of the spray assembly at area 4-4 of FIG. 3.
Figure 5:
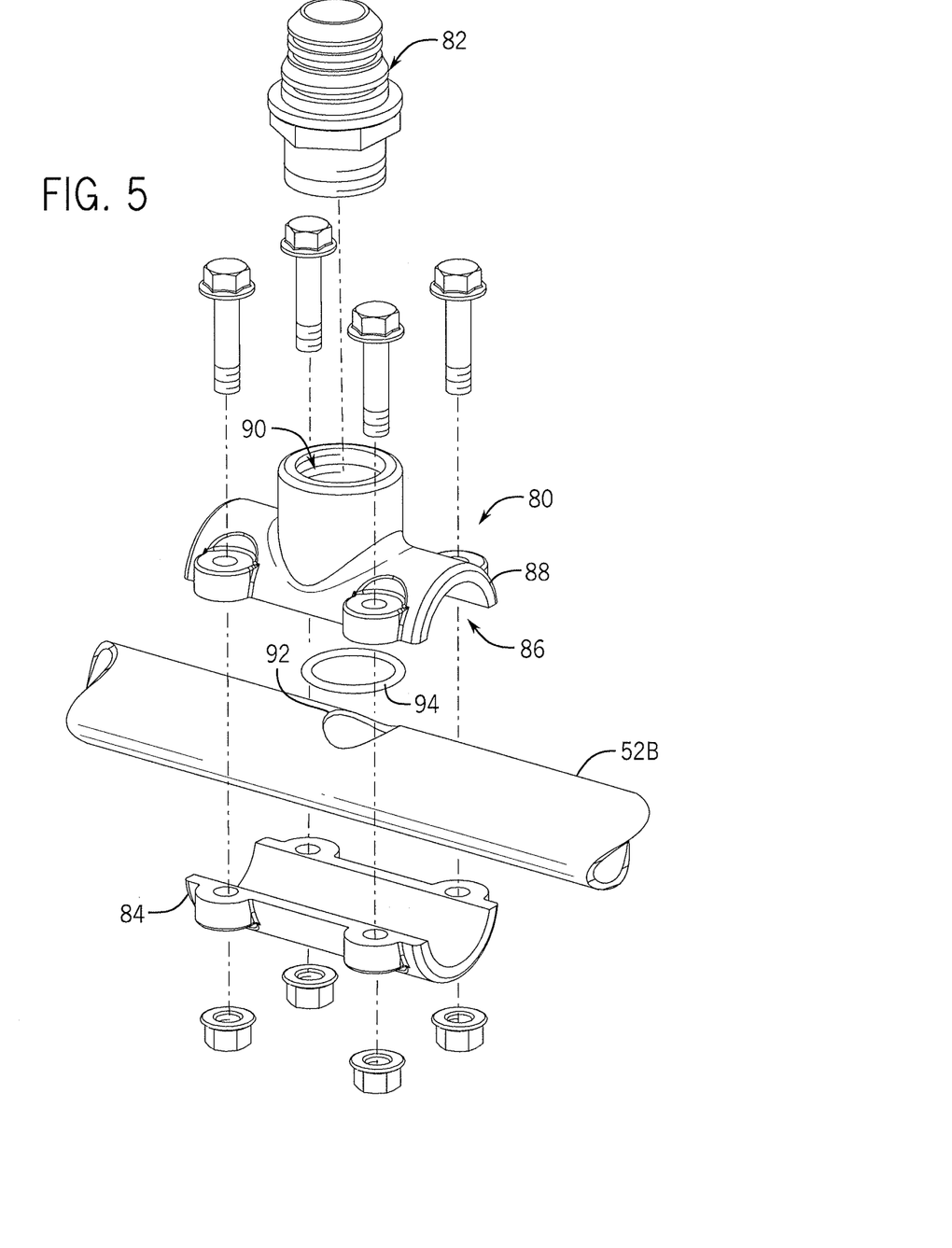
FIG. 5 is a partial exploded assembly view of a saddle fitting for coupling a spray pipe to a feed pipe.

Referring now also to FIG. 3, more specifically, the conduits for a boom section 40 may include one or more feed pipes 50, one or more spray pipes 52, one or more control valves 54, and one or more spray nozzles 56. For instance, each inner boom section (as shown in FIG. 2) may include two feed pipes 50A and 50B, of the same or varied length, that are joined end-to-end and deliver material from the supply tank 30 to three spray pipes 52A, 52B and 52C, of the same or varied length. In the illustrated example, the inner spray pipe 52A may have five equally spaced apart spray nozzles 56, the middle spray pipe 52B may have seven equally spaced apart spray nozzles 56, and the outer spray pipe 52C may have six equally spaced apart spray nozzles. The spray pipes 52A-C may also be spaced apart end-to-end a length consistent with the spacing between the spray nozzles 56. The spray pipe 52A may be coupled to the feed pipe 50A, the spray pipe 52C may be coupled to the feed pipe 50B, and spray pipe 52B may be coupled to one or both of the feed pipes 50A-B. Each of the feed pipes 50A-B and the spray pipes 52A-C may be formed of a unitary tubular body (i.e., not an assembly), for example, formed as a continuous extruded body with no seams or breaks or a fabricated body with seams/breaks joined together to be essentially continuous.

The spray pipes 52A-C may be coupled to the feed pipes 50A-B by coupling assemblies 60 to which the control valves 54 are mounted. As shown in FIG. 4, the union assemblies 60 may include a union coupler 62 coupling the ends of the feed pipes 50A-B. Various techniques may be used to securely connect the union coupler 62 to the feed pipes 50A-B. However, a liquid-tight connection may be achieved using pipe clamps 64 with spilt or slide-on collars 66 that fit on and mate against flanged or unflanged ends of the feed pipes 50A-B. O-rings, gaskets or other seals may also be used. The pipe clamp 64 may have a flexible strap 68 and threaded fastener retainer 70 as well to provide the clamping force on the collar 66. This arrangement has the additional advantage of allowing for initial rotational adjustment of the feed pipes 50A-B relative to the union coupler 62 for alignment purposes with other union couplers 62 or the spray pipes 52A-C, while still providing a tight connection.

A third leg of the union coupler 62 may couple to a connector pipe 72, in the same or similar manner, which couples to the associated spray pipe 52A-C and effectively provides a valve housing for the associated control valve 54. In the illustrated example, the connector pipe 72 has a small branch pipe 74 connecting to a mounting flange 76 to which the control valve 54 mounts. The control valve 54 may be any suitable architecture or mode of operation. In the illustrated example, the control valve 54 is an electrically-actuated ball valve with electric lines 78 leading to the vehicle electrical system and under the control of the spray control hardware onboard the sprayer 20. The inside of the connector pipe 72 may contain, or be formed with, a valve seat (not shown) to cooperate with the valve head (not shown) to allow the control valve 54 to selectively vary and impede flow from the feed pipes 50A-B to the associated spray pipe(s) 52A-C. Thus, for example, the spray assembly may be controlled selectively to provide a uniform flow across each boom section, including through each spray pipe within each boom section. Alternatively, flow may be varied, or completely shut off, for a particular boom section or boom sections, or one or more spray pipes within one or more boom sections.

In the illustrated example, there is one coupling assembly 60 and control valve 54 arrangement mounted to each end of the feed pipes 50A-B. However, rather than four separate assemblies there are three, with the central assembly being shared by, and coupled to, ends of both feed pipes 50A-B, as described above and shown in FIGS. 3 and 4. The coupling assemblies at the free ends of the feed pipes 50A-B may have the same configuration in which case the respective inner and outer ends are closed by an end cap or plug member.

Referring now also to FIGS. 5-8, the connector pipe 72 may connect to the associated spray pipe 52A-C via a saddle fitting 80. In the illustrated example, the connection is a threaded connection using an externally threaded adapter 82 that threads into internal threads at the open ends of the connector pipe 72 and the saddle fitting 80. The saddle fitting 80 itself may be a unitary piece, or as shown in the illustrated example, it may have a multi-part, split construction, for example, being split in either of two perpendicular planes intersection and extending along a central long axis "A" of the tubular body of the associated spray pipe 52A-C (see FIG. 6).

Figures 6, 7, 8:
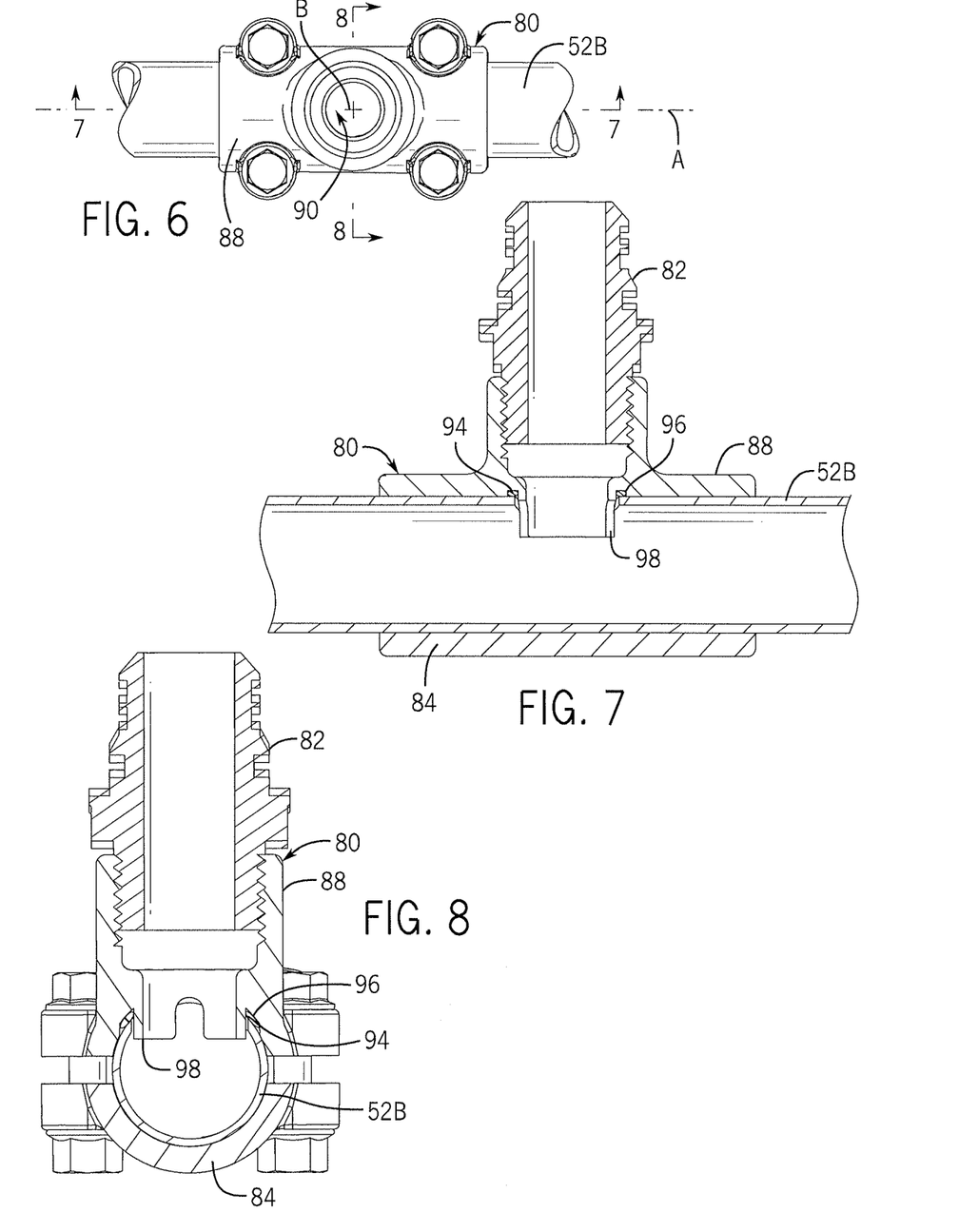
FIG. 6 is a top view thereof.
FIG. 7 is a sectional view thereof taken along line 7-7 of FIG. 6.
FIG. 8 is a sectional view thereof taken along line 8-8 of FIG. 6.

As illustrated, the saddle fitting 80 is split along what would be a horizontal plane, as viewed in FIG. 8. A first (lower) fitting part 84 may form part of a first passageway 86 receiving the tubular body of the associated spray pipe 52A-C. A second (upper) fitting part 88 may form the complementary portion of the first passageway 86. But fitting parts 84 and 88 may have cupped, or semi-cylindrical channels configured to fit against the cylindrical tubular body, as illustrated. The fitting parts 84 and 88 may also have mounting flanges with bolt holes for threaded fasteners, which are used to tightly clamp the saddle fitting 80 to the spray pipe 52A-C. The second fitting part 88 may also form a second passageway 90 that opens about and extends along a second axis "B" (see FIG. 6). The second passageway 90 may have a cylindrical configuration. The second axis B, and thus the second passageway 90, may extend at any suitable angular orientation about the first axis A, such as 90 degrees in the illustrated example. Similarly, the second axis B, and thus the second passageway 90, may extend at any angular orientation with respect to an axis perpendicular to the first A and second B axes, such as 90 degrees in the illustrated example. The illustrated example thus may be viewed as a right angle or "T" saddle fitting. As noted above, the saddle fitting 80 may have threads, such as internal threads within the second passageway 90, that threadably engage with threads on the adapter 82 to couple with the connector pipe 72, and thereby, the associated feed pipe 50A-B.

When mounted to the associated spray pipe 52A-C, the second passageway 90 aligns with a feed opening 92 formed in the arcuate, circumferential face of the tubular body of the spray pipe 52A-C. The facial feed opening 92 will be disposed about the second axis B in alignment or registration with the second passageway 90. One or more seals or gaskets, such as O-ring 94, may be disposed about the feed opening 92 between the tubular body of the spray pipe 52A-C and the saddle fitting 80. Further, recesses or grooves, such as O-ring groove 96, may be formed in either or both of the saddle fitting 80 and the spray pipe 52A-C to locate and seat the O-ring 94 or other seal(s) around the feed opening 92. The O-ring 94 may also fit onto an inner pipe section 98 of the saddle fitting 80, which may be formed as a unitary part of the fitting part 88, such as in a cylindrical form sized to fit within the associated feed opening 92 to thereby aid in alignment of the saddle fitting 80 and transfer of material into the associated spray pipe 52. In the illustrated example, there is one saddle fitting 80, feed opening 92 and O-ring 94 arrangement for each spray pipe 52A-C.

Figures 9, 10:
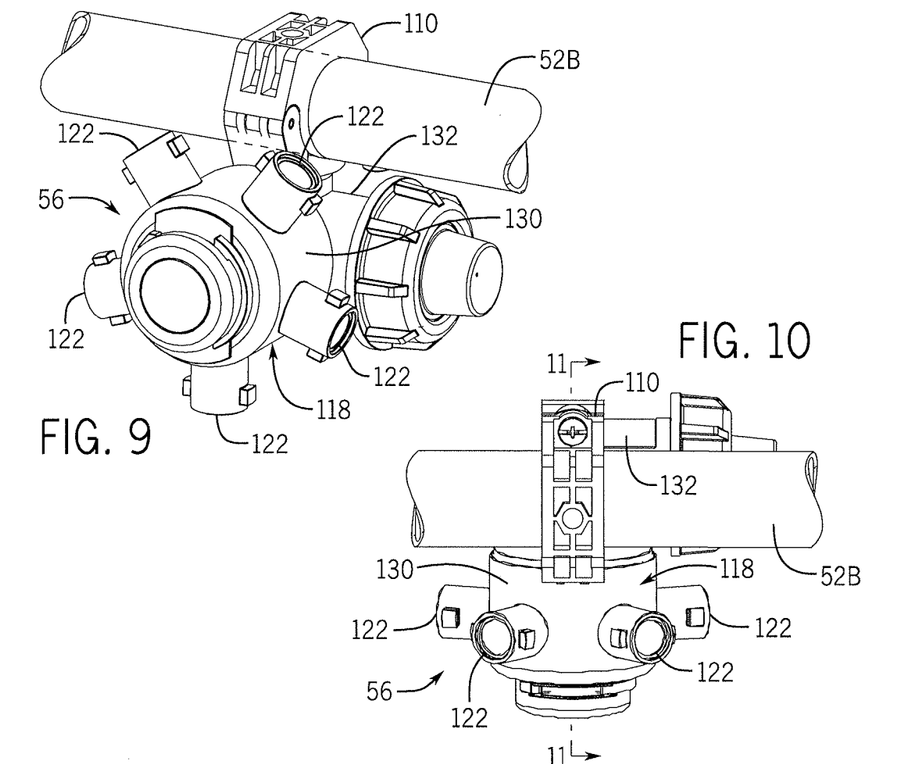
FIG. 9 is a partial perspective view of a nozzle arrangement at area 9-9 of FIG. 3.
FIG. 10 is a top view thereof as assembled.
Figure 11:
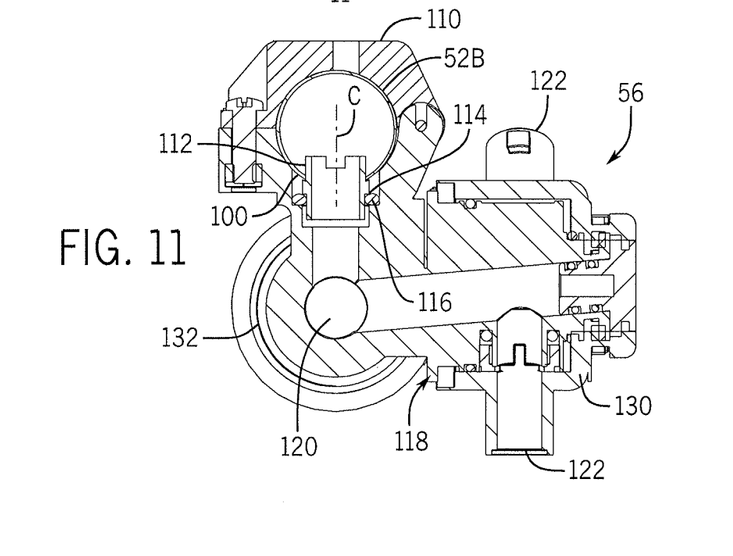
FIG. 11 is an end sectional view thereof taken along line 11-11 of FIG. 9.

Referring also to FIGS. 9-11, each spray pipe 52A-C may mount one or more of the spray nozzles 56. The spray pipes 52A-C may be formed with one or more facial nozzle openings 100 that open about a third axis "C" (see FIG. 11), the angular position relative to the first axis A of which is set, or dependent upon, that of the second axis B of the feed opening 92. In other words, the angular orientations of each feed opening 92 and nozzle opening 100 are coordinated so that a proper angle about the first axis A may be achieved between the feed pipes 50A-B and the spray nozzles 56 for a desired mounting arrangement and spray angle. In practice, this may mean that each feed opening 92 is formed in the spray pipe 52A-C and then used to clock the angular orientation of each nozzle opening 100, or vice versa. By way of example, a spray pipe may be clamped or otherwise held in a fixed rotational orientation so that a hole may be cut into the spray pipe using a suitable technique (e.g., boring, punching, laser-cutting, etc.) for the feed opening 92. Then, the spray pipe may be repositioned (e.g., rotated a number of degrees) and re-clamped so that a hole for the nozzle opening 100 may be cut into the spray pipe.

The spray pipes 52A-C may each carry multiple spray nozzles 56, and thus may each be formed with multiple nozzle openings 100. Although it is possible for the spacing and angular orientation of one or more individual nozzle openings 100 (and thereby individual spray nozzles 56) to vary with respect to the others or the feed opening 92, the nozzle openings 100 (and thereby the spray nozzles 56) may be aligned along the length of the spray pipes 52A-C in equally spaced intervals. Thus, all of the nozzle openings 100 may be clocked at the same angle with respect to the feed opening 92. The quantity and spacing between the nozzle openings 100 may be set according to characteristics of the spray nozzles 56 or a parameter of the field or application of use. For example, the nozzle openings 100 may be spaced apart according to a crop row spacing dimension in the field to be sprayed by the sprayer 20. In the illustrated example, in each spray pipe 52A-C, the nozzle openings 100 (and thereby the spray nozzles 56) are aligned and approximately 150-180 degrees apart from the feed openings 92 and 15-20 inches apart from each other. In the illustrated example, the spray pipes 52A-C are positioned so that the spacing of adjacent spray nozzles 56 remains consistent across the spray pipes 52A-C (e.g., the outermost spray nozzle 56 of spray pipe 52A and the innermost spray nozzle 56 of spray pipe 52B are spaced apart approximately the same as adjacent spray nozzles 56 on the respective spray pipes 56A-B). Further, as shown in FIG. 3, in the illustrated example, the spray pipes 52A-C are all of different lengths, with the spray pipe 52A carrying five spray nozzles 56, the spray pipe 52B carrying seven spray nozzles 56 and the spray pipe 52C carrying six spray nozzles 56. The respective spray pipes 52A-C may thus have a corresponding number of nozzle openings 100. As one commercially viable example, a 120-foot boom with a 15-inch spacing between adjacent nozzle openings 100 would have 97 spray nozzles 56.

Referring to FIGS. 9-11, the spray nozzles 56 may include a hinged pipe clamp 110 with a short pipe section 112 configured to fit within the associated nozzle opening 100 to aid in alignment of, and transfer of material into, the spray nozzles 56. A groove 114 around the pipe section 112 may contain an O-ring 116 or other seal for sealing off the nozzle opening 100 when the pipe clamp 110 is secured to the associated spray pipe 52A-C. The pipe clamp 110 mounts the remainder of the nozzle 56, including a nozzle body 118 having an internal flow passage 120 leading to one or more spray outlets 122. Otherwise, the spray nozzles 56 may be of any suitable known wet or dry spray nozzle construction, such as any of the various spray nozzles commercially available from Hypro, LLC of New Brighton, Minn., including any of various fixed position or movable head spray nozzles, or pulse width modulated spray nozzles for use with agricultural sprayers. For example, in the illustrated example the spray nozzles 56 have a 5-way turret-style indexing head 130 having five spray outlets 122, which may be fitted with any of various spray tips (not shown) to effect particular directional or broadcast spray characteristics. A diaphragm check valve (not shown) mounted in a rear housing 132 regulates an ambient air vent (not shown) through a vent passageway 134 (see FIG. 14) that communicates with the flow passage 120 to prevent flow of spray material when the pump is turned off.

The above-described arrangement thus provides a sealed flow path leading from the spray material supply tank 30 onboard the sprayer 20 to the spray nozzles 56. Specifically, a flow path is created from the supply tank 30 via any suitable flexible or rigid connecting pipes, hoses or other lines coupled to the coupling assembly 60 mounted to the innermost end of the feed pipe 50A. The flow path continues through feed pipe 50A to the middle coupling assembly 60 and on through the feed pipe 50B to the outermost coupling assembly 60. The flow path moves from the feed pipes 50A-B to the spray pipes 52A-C through the coupling assemblies 60, including union coupler 62 and connector pipe 72, depending on the state of the associated control valve 54. From there, the flow continues uninterrupted through the feed opening 92 of each spray pipe 52A-C to the associated nozzle openings 100 and into the nozzle body flow passage 120 and out the spray outlets 122 of the spray nozzles 56. Return lines (not shown) coupled to the coupling assemblies or the feed and/or spray pipes return excess spray material to the supply tank 30, as needed.

Figures 12, 13:
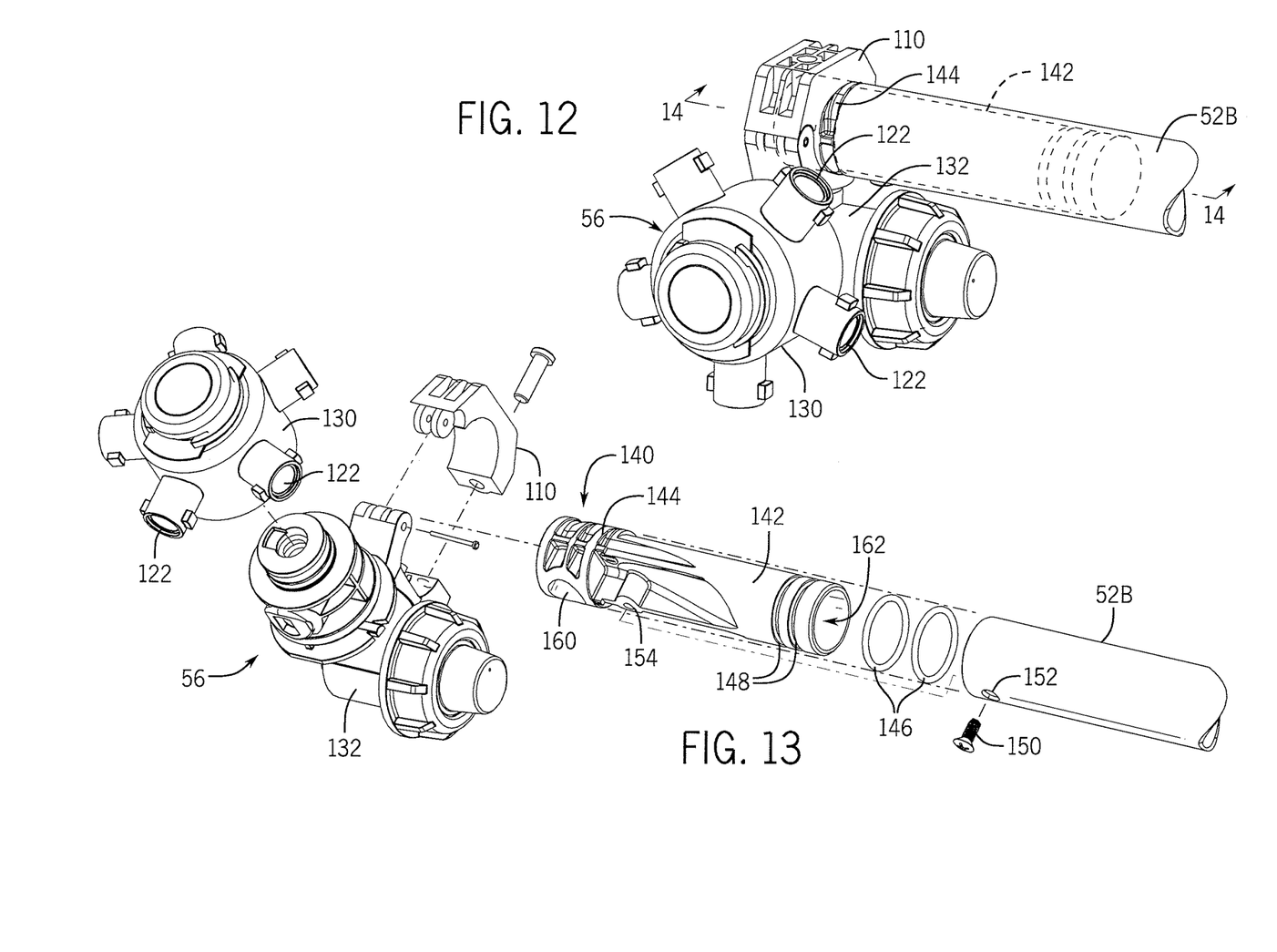
FIG. 12 is a partial perspective view of an aspirator and nozzle arrangement at area 9-9 of FIG. 3.
FIG. 13 is an exploded assembly view thereof.
Figure 14:
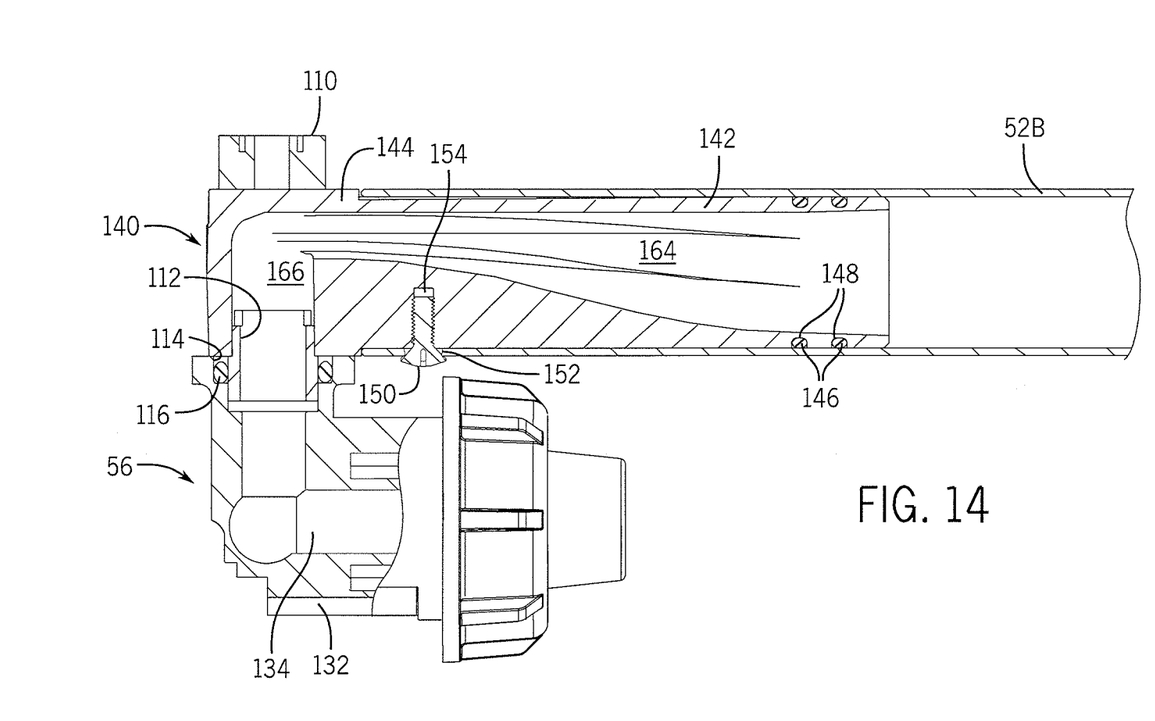
FIG. 14 is a front sectional view thereof take along line 14-14 of FIG. 12.

Referring now to FIGS. 12-14, the innermost and/or outermost spray nozzle 56 of each spray pipe 52A-C may be mounted onto an inset aspirator 140. Each aspirator 140 may have a narrow, elongated body 142 configured to fit through an open end of, and within, the associated spray pipe 52A-C. A head portion 144, which in the illustrated example has an enlarged diameter than the body 142 and the inner diameter of the spray pipe 52A-C, is sized and configured to contact the end of the associated spray pipe 52A-C such that it protrudes outside of the associated spray pipe 52A-C. One or more O-rings 146 (two shown) or other seals or gaskets may be fit into grooves 148 formed in the outer diameter of the aspirator body 142. One or more fasteners (e.g., threaded connectors, rivets, crimps, detents and so on), such as a set screw 150 may be used to fix the axial and rotational position of the aspirator 140 relative to the associated spray pipe 52A-C. The set screw 150 may, for example, fit through a simple hole 152 in the spray pipe 52A-C and thread into a pocket 154 in the aspirator body 142.

The aspirator 140 may have a facial opening 160, which in the illustrated example provides a nozzle opening, which is in communication with an internal passageway 162 extending from the facial opening 160 and through the aspirator head 144 and body 142. The internal passageway 162 may have a converging section 164 that narrow, or decreases in opening size, in the direction toward the head 144. In the illustrated example, the internal passageway 162 follows a bend such that an end section 166 of the internal passageway 162 leading from the facial opening 160 in the aspirator head 144 extends radially at an angle to, for example approximately 90 degrees, the converging section 164. Since the spray nozzle 56, which can be open to ambient air through the check valve, is mounted to the facial opening 160 (e.g., in a manner as described above), the internal passageway 162 may be in communication with ambient air through the nozzle vent passageway 134 when the check valve is open. As is understood in the art, the converging section 166 increases the fluid flow velocity and creates a pressure drop within the aspirator 140, that is, an area of low pressure within the converging section that may be below atmospheric pressure. This low pressure may entrain air into the aspirator head 144 and work to evacuate air from within the spray pipe 52A-C out through the spray nozzle 56. In this way, the spray pipe 52A-C is aspirated to alleviate trapped air within the flow stream that may otherwise impede flow to the spray nozzles 56.

The disclosed boom sprayer arrangement, described above largely in the context of the illustrated example, offers improvements to manufacturing and assembly not provided in existing sprayers. This disclosure effectively disassociates or eliminates the coordination of the action of connecting the spray pipes and/or feed pipes and the positioning of the spray pipes/feed pipes, and thus significantly reduces the complexity of assembly. The use of unitary feed and spray pipes reduces or eliminates the need to align features of each mating pipe during the joining process. Secondary alignment procedures, of the type needed with threaded or welded connections of the mating pipes, are no longer needed. The holes may be formed into the unitary tubular body at the angular orientation and spacing required. The saddle fitting then fits over the continuous length of pipe, rather than being inserted between mating pipe sections, to couple the spray pipe to a feed pipe. An inset aspirator may be oriented and positioned by a simple set screw, detent or other mechanical connection to the spray pipe, and thus avoids the same connection and positioning complexity mentioned above. Furthermore, by divorcing the alignment aspect from the connection aspect, the disclosure facilitates alignment without compromising the integrity of the various connections, for example, to allow liquid-tight sealing for use in wet boom applications.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the any use of terms "comprises" and/or "comprising" in this specification specifies the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. In a sprayer having a boom frame, a spray assembly mounted to the boom frame comprising:
    at least one feed pipe operationally coupled to a spray material supply;
    at least one spray pipe having a unitary tubular body including an internal passageway extending along a first axis between opposite ends, the tubular body having at least one facial feed opening formed in the tubular body between the ends and opening about a second axis at an inclined angle to the first axis and having at least one facial nozzle opening formed in the tubular body between the ends; and
    at least one saddle fitting mounted to the tubular body of the at least one spray pipe and to the at least one feed pipe, the at least one saddle fitting defining a first passageway extending along the first axis and receiving the tubular body and including a saddle fitting opening defining a second passageway extending along the second axis, wherein the saddle fitting opening is in registration with the at least one facial feed opening and is configured to transfer spray material from the at least one feed pipe;
    at least one nozzle coupled to the tubular body of the at least one spray pipe at the at least one facial nozzle opening and in communication with the first and second passageways, and
    an aspirator at least in part received within and extending into an open end of the tubular body of the at least one spray pipe.

2. The assembly of claim 1, wherein the at least one nozzle is mounted to the tubular body of the at least one spray pipe at the at least one facial nozzle opening, wherein the at least one facial nozzle opening opens about a third axis having an angular position about the first axis dependent upon an angular position of the second axis.

3. The assembly of claim 2, wherein there are a plurality of nozzles mounted to the tubular body of the at least one spray pipe at a plurality of facial nozzle openings in the tubular body spaced apart along the first axis.

4. The assembly of claim 1, further including a connector pipe extending along the second axis and coupled to the at least one feed pipe and the tubular body of the at least one spray pipe.

5. The assembly of claim 1, wherein the aspirator has an elongated body disposed within the tubular body of the at least one spray pipe and a head extending outside of the tubular body of the at least one spray pipe, and
    wherein the head has a facial opening in communication with an internal passageway located within the elongated body and extending from the head and through the elongated body.

6. The assembly of claim 5, wherein the internal passageway has a converging section narrowing in a direction toward the head of the aspirator, wherein the converging section is located within the elongated body.

7. The assembly of claim 6, wherein the internal passageway follows a bend such that an end section of the internal passageway leading from the facial opening in the head extends at an angle to the converging section.

8. The assembly of claim 1, wherein the at least one saddle fitting is split in along the first axis so that the first passageway is defined by a first fitting part that couples to a second fitting part, wherein one of the first fitting part and the second fitting part includes a pipe section defining the saddle fitting opening, the pipe section configured to extend into the at least one facial feed opening.

9. The assembly of claim 1, further including at least one seal disposed about the at least one facial feed opening between the at least one saddle fitting and the tubular body of the at least one spray pipe.

10. A sprayer, comprising:
a boom frame;
at least one spray assembly mounted to the boom frame, including:
at least one feed pipe operationally coupled to a spray material supply;
at least one spray pipe having a unitary tubular body including an internal passageway extending along a first axis between opposite ends, the tubular body having at least one facial feed opening formed in the tubular body between the ends and opening about a second axis at an inclined angle to the first axis and having at least one facial nozzle opening formed in the tubular body between the ends;
at least one saddle fitting mounted to the tubular body of the at least one spray pipe and to the at least one feed pipe, the at least one saddle fitting defining a first passageway extending along the first axis and receiving the tubular body and including a saddle fitting opening defining a second passageway extending along the second axis, wherein the saddle fitting opening is in registration with the at least one facial feed opening and is configured to transfer spray material from the at least one feed pipe;
at least one nozzle coupled to the tubular body of the at least one spray pipe at the at least one facial nozzle opening and in communication with the first and second passageways; and
an aspirator at least in part received within and extending into an open end of the tubular body of the at least one spray pipe.

11. The sprayer of claim 10, wherein the tubular body of the at least one spray pipe has a plurality of facial nozzle openings that each open about a third axis having an angular position about the first axis dependent upon an angular position of the second axis.

12. The sprayer of claim 11, wherein there are a plurality of nozzles mounted to the tubular body of the at least one spray pipe at the plurality of facial nozzle openings in the tubular body spaced apart along the first axis.

13. The sprayer of claim 10, wherein the aspirator has an elongated body disposed within the tubular body and a head extending outside of the tubular body, and
wherein the head has a facial opening in communication with an internal passageway extending from the head and through the elongated body.

14. The sprayer of claim 13, wherein the internal passageway has a converging section narrowing in a direction toward the head of the aspirator, wherein the converging section is located within the elongated section.

15. The sprayer of claim 10, wherein the at least one saddle fitting is split along the first axis so that each first passageway is defined by a first fitting part that couples to a second fitting part, wherein one of the first fitting part and the second fitting part includes a pipe section defining the saddle fitting opening, the pipe section configured to extend into the at least one facial feed opening.

16. The sprayer of claim 10, wherein each spray assembly further includes at least one seal disposed about the at least one facial feed opening between the at least one saddle fitting and the tubular body of the at least one spray pipe.

17. The sprayer of claim 10, wherein each spray assembly further includes a A connector pipe extending along the second axis and coupled to the at least one feed pipe and the tubular body of the at least one spray pipe.

18. The assembly of claim 6, wherein the internal passageway extends from the aspirator facial opening, through the head of the aspirator, and through the aspirator body and each of the at least one facial feed opening and the at least one facial nozzle opening are formed in an arcuate, circumferential face of the unitary tubular body.

* * * * *